(12) United States Patent
Coleman

(10) Patent No.: US 8,180,913 B2
(45) Date of Patent: May 15, 2012

(54) APPARATUS AND METHOD FOR PROVIDING ACCESS TO A DATA STREAM BY A PLURALITY OF USERS AT A SAME TIME

(75) Inventor: David Allen Coleman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1029 days.

(21) Appl. No.: 11/531,472

(22) Filed: Sep. 13, 2006

(65) Prior Publication Data

US 2007/0136452 A1   Jun. 14, 2007

Related U.S. Application Data

(62) Division of application No. 09/616,140, filed on Jul. 13, 2000, now Pat. No. 7,139,791.

(51) Int. Cl.
   *G06F 15/16* (2006.01)
(52) U.S. Cl. ......................... 709/231; 370/270
(58) Field of Classification Search .................. 709/205, 709/223, 231; 370/270
   See application file for complete search history.

(56) References Cited

U.S. PATENT DOCUMENTS

| | | | |
|---|---|---|---|
| 4,942,573 A | | 7/1990 | Woodward |
| 5,003,532 A | * | 3/1991 | Ashida et al. ............... 348/14.09 |
| 5,212,687 A | | 5/1993 | De La Boudonnaye |
| 5,265,095 A | | 11/1993 | Fiedler et al. |
| 5,270,687 A | * | 12/1993 | Killebrew, Jr. ................ 345/602 |
| 5,337,412 A | | 8/1994 | Baker et al. |
| 5,491,508 A | | 2/1996 | Friedell et al. |
| 5,497,370 A | | 3/1996 | Hamada et al. |
| 5,530,795 A | * | 6/1996 | Wan .............................. 715/759 |
| 5,761,200 A | | 6/1998 | Hsieh |
| 5,991,796 A | * | 11/1999 | Anupam et al. ............... 709/206 |
| 6,226,673 B1 | * | 5/2001 | Yoshimoto ..................... 709/223 |

(Continued)

FOREIGN PATENT DOCUMENTS

JP   06314248   8/1994

(Continued)

OTHER PUBLICATIONS

Watanabe et al, "Distributed Multiparty Desktop Conferencing System: Mermaid", CSCW 90 Proceedings, Oct. 1990, pp. 27-39.

(Continued)

*Primary Examiner* — David Lazaro
*Assistant Examiner* — Marie Georges Henry
(74) *Attorney, Agent, or Firm* — Yee & Associates, P.C.; Steven L. Bennett

(57) ABSTRACT

A system for providing access to a data stream by a plurality of users at a same time. A data stream splitter manager listens for new client device connections. When a new client device connection is identified, the data stream splitter manager generates a pseudo-terminal for the client device and adds the client device and pseudo-terminal information to a data stream splitter table. In addition, a data stream splitter is generated to handle the data transfer. The data stream splitter searches the data stream splitter table for client devices participating in a system resource sharing session. The data stream splitter sends a data stream associated with the shared system resource to the associated client device pseudo-terminals. Also, the data stream splitter sends data from the client devices to the pseudo-terminals and then to the data stream. Consequently, client devices involved in the session has shared system resource access.

18 Claims, 5 Drawing Sheets

U.S. PATENT DOCUMENTS

| | | | |
|---|---|---|---|
| 6,266,345 | B1 | 7/2001 | Huang |
| 6,279,040 | B1 * | 8/2001 | Ma et al. .................. 709/231 |
| 6,285,661 | B1 | 9/2001 | Zhu et al. |
| 6,327,276 | B1 | 12/2001 | Robert et al. |
| 6,336,134 | B1 * | 1/2002 | Varma .................. 709/205 |
| 6,405,367 | B1 * | 6/2002 | Bryant et al. .................. 717/115 |
| 6,538,704 | B1 | 3/2003 | Grabb et al. |
| 6,625,643 | B1 | 9/2003 | Colby et al. |
| 6,667,977 | B1 | 12/2003 | Ono |
| 6,961,838 | B2 * | 11/2005 | Reuter et al. .................. 711/203 |
| 7,139,791 | B1 | 11/2006 | Coleman |
| 7,155,667 | B1 * | 12/2006 | Kotler et al. .................. 715/210 |

FOREIGN PATENT DOCUMENTS

| | | |
|---|---|---|
| JP | 09054741 | 2/1997 |
| JP | 09259083 | 3/1997 |

OTHER PUBLICATIONS

USPTO Non-final office action dated Mar. 10, 2004 regarding U.S. Appl. No. 09/616,140.

Response to Mar. 10, 2004 Non-final office action, dated Jun. 10, 2004 regarding U.S. Appl. No. 09/616,140.

USPTO Final office action dated Aug. 23, 2004 regarding U.S. Appl. No. 09/616,140.

USPTO Non-final office action dated May 20, 2005 regarding U.S. Appl. No. 09/616,140.

Response to May 20, 2005 Non-final office action dated Aug. 22, 2005 regarding U.S. Appl. No. 09/616,140.

USPTO Final office action dated Nov. 1, 2005 regarding U.S. Appl. No. 09/616,140.

Response (non-compliant) to Nov. 1, 2005 Final office action dated Feb. 1, 2006 regarding U.S. Appl. No. 09/616,140.

Response to Nov. 1, 2005 Final office action dated Apr. 27, 2006 regarding U.S. Appl. No. 09/616,140.

USPTO Notice of Allowance dated Jul. 7, 2006 regarding U.S. Appl. No. 09/616,140.

Comments on Statement of Reasons for Allowance dated Sep. 15, 2006 regarding U.S. Appl. No. 09/616,140.

USPTO Supplemental Notice of Allowability dated Oct. 17, 2006 regarding U.S. Appl. No. 09/616,140.

* cited by examiner

```
Console login: root
root's Password:
You entered an invalid login name or password.
login: root
root's Password:
```

*FIG. 7*

```
***********************************************************************************
*                                                                                  *
*                                                                                  *
*   Welcome to AIX!                                                                *
*                                                                                  *
*                                                                                  *
*   Please see the README file in /usr/lpp/bos for information pertinent to        *
*   this release of the AIX Operating System.                                      *
*                                                                                  *
*   IBM'S INTERNAL SYSTEMS MUST BE ONLY USED FOR CONDUCTING IBM'S BUSINESS         *
*   OR FOR PURPOSES AUTHORIZED BY IBM MANAGEMENT                                   *
*                                                                                  *
*   USE IS SUBJECT TO AUDIT AT ANY TIME BY IBM MANAGEMENT                          *
*                                                                                  *
***********************************************************************************
```

Last login: Mon May  1 15:43:36 2000 on /dev/tty0

[root@177net43] /# After typing this sentence, I will "hot key" to a debugger by typing control-backslash, but the typed character will not be seen:

```
GPR0   608642A3 548E6BF8 0221F610 00000000 00000000 A8A9AAAB A4A5A6A7 50000000
GPR8   00000000 00000000 74DA619C 00000000 00000000 71DBB234 28822048 71DBB248
GPR16  74DA611C 71AC1900 71DBB200 00000028 00000000 00003EBC 00000018 0000111C
GPR24  00000278 000002A0 0000FFFF 02220038 0221DFF4 755FCC00 00000000 755FCEDC

MSR 000090B2 CR    28822042 LR    0221770C CTR    0000007D MQ   00000000
XER 20000000 SRR0  021EDB00 SRR1  000090B2 DSISR  42000000 DAR  200551B0

IAR 021EDB00  (ORG+021EDB00)  ORG=00000000 Mode: VIRTUAL
021EDB00   84CA0004   7C002914 42400024 84AA0004 |....|.).B@.$....|
             |     1wzu     r6 , 0x4 (r10)
021EDB10   7C003114   4200FFEC 7C002914 7C000194 ||.1.B...|.).|...|

|
021EDB00  84CA0004 7C002914 42400024 84AA0004   |....|.).B@.$....|
021EDB10  7C003114 4200FFEC 7C002914 7C000194   ||.1.B...|.).|...|
021EDB20  40820038 419DFFA4 48000014 7C003114   |@..8A...H...|.1.|
021EDB30  7C000194 40820024 419DFF90 5C00603E   ||...@..$A...|.(.|
021EDB40  5406801E 7C003014 5400843E 7C000194   |T...|.0.T..>|...|
021EDB50  6803FFFF 4E800020 394A0004 7D6103A6   |h...N.. 9J..}a..|
021EDB60  7CA0542A 55661F38 7D8C3278 7C002814   ||.T*Uf.8}.2x|.(.|
```

Debugger entered via keyboard.

```
>0> this is Mark , are you looking at this machine?  YES
  Too many parameters; excess truncated
032-001 You entered a command "this" that is not valid.
>0> don't bother, it is running DELETEDmb DELETED, it is not a valid config
  Too many parameters; excess truncated
032-001 You entered a command "don't" that is not valid.
>0> I need this crash anyway to debug an auto-screening "bot" , let me keep it 5 or 10 Too many
parameters; excess truncated
032-001 You entered a command "I" that is not valid.
>0> minutes PLEASE ???!???  -doco
032-001 You entered a command "minutes" that is not valid.
>0> ok  Want me to reboot (as I saw you doing) when I'm done? yea
```

APPARATUS AND METHOD FOR PROVIDING ACCESS TO A DATA STREAM BY A PLURALITY OF USERS AT A SAME TIME

This application is a divisional of application Ser. No. 09/616,140, filed Jul. 13, 2000 now U.S. Pat. No. 7,139,791, status allowed, which is herein incorporated by reference.

BACKGROUND OF THE INVENTION

1. Technical Field

The present invention is directed to an apparatus and method for providing access to a data stream by a plurality of users at a same time. In particular, the present invention is directed to an apparatus and method for data stream splitter management for multiplexing access by a plurality of users to the same data stream.

2. Description of Related Art

Presently, in distributed data processing systems, when a user is involved in a session making use of system resources, the session is typically set up so that a single user has access to the system resource during the session. Thus, only a single user is able to make use of the system resource until the session is completed and the system resource is released for use by another user.

Recently, systems have been devised for allowing multiple users to monitor the status of a system resource in a single session. Typically, in these systems, one user has full access to the system resources and is provided with the ability to use and/or modify these system resources. The other users involved in the session act as observers only and are not provided with full access to the system resources.

In either of the above systems, a problem arises if a first user wishes to share modifications to a system resource with a second user, and the second user wishes to share modifications with the first user. Each user must gain access to the system resource, make their modifications, release access to the system resource and then allow the other user to gain access and make their modifications. The first user must then re-access the system resource to inspect the modifications of the second user. There is no mechanism by which both users can have full access to the system resource at approximately the same time.

Thus, it would be beneficial to have an apparatus and method whereby a plurality of users are provided full access to the same system resource in a same session at approximately a same time and be able to share the results of each user's access to the system resource with other users in the session.

SUMMARY OF THE INVENTION

The present invention provides an apparatus and method for providing full access to a data stream by a plurality of users at approximately a same time. The apparatus and method include a data stream splitter manager that listens for new connections from client devices. When a new connection from a client device is identified, the data stream splitter manager generates a pseudo-terminal for the client device and adds the client device and pseudo-terminal information to a data stream splitter table. In addition, if a data stream splitter is not already established for handling data transfer between the data stream splitter manager and a requested resource, a new data stream splitter may be generated to handle the data transfer.

Thereafter, the data stream splitter associated with the system resource searches the data stream splitter table for client devices that are sharing access to the system resource. The data stream splitter sends data from the data stream associated with the system resource to the pseudo-terminals associated with the client devices that are currently sharing the system resource in a sequential manner. Similarly, the data stream splitter receives input from the client devices via the pseudo-terminals and sends the input to the data stream associated with the system resource. In this way, each client device has an individual connection to the system resource but the output from the system resource is shared by each of the client devices. Additionally, each client device is provided with the output from the system resource in a realtime manner.

Other features and advantages of the present invention will be described in, or will become apparent, to those of ordinary skill in the art in view of the figures and the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an illustration of a display of a data stream from a client device implementing the present invention.

DETAILED DESCRIPTION OF THE PREFERRED EMBODIMENTS

Figure 1:
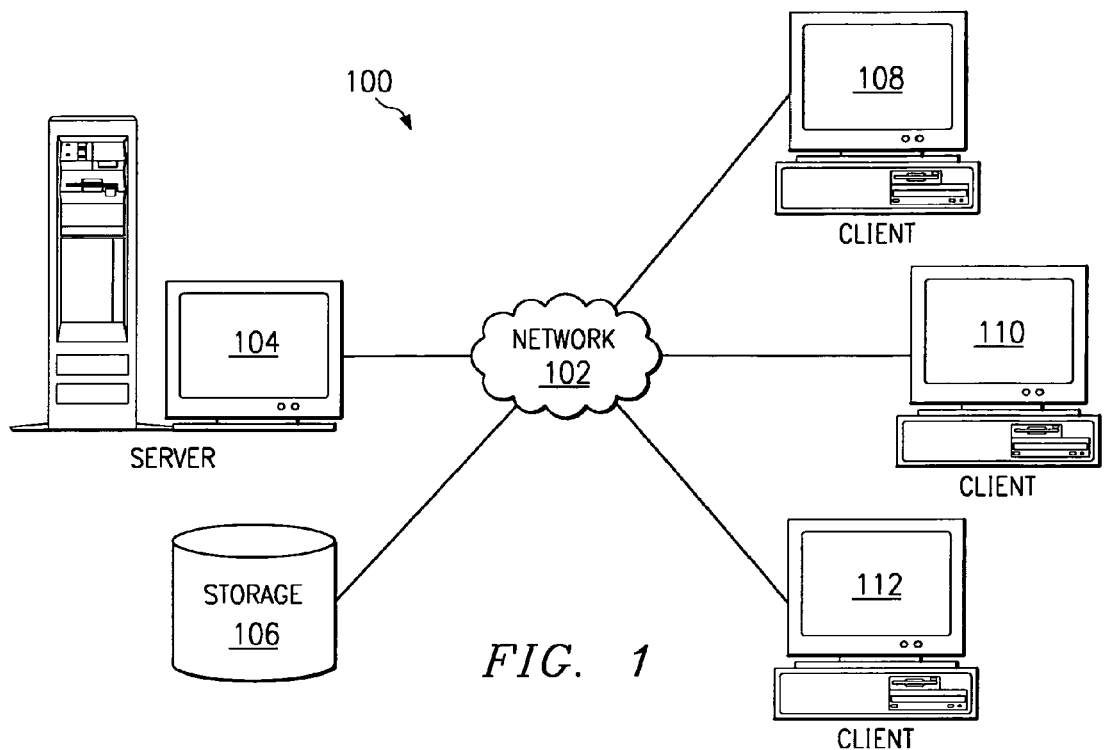
FIG. 1 is a diagram illustrating a distributed data processing system according to the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108-112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
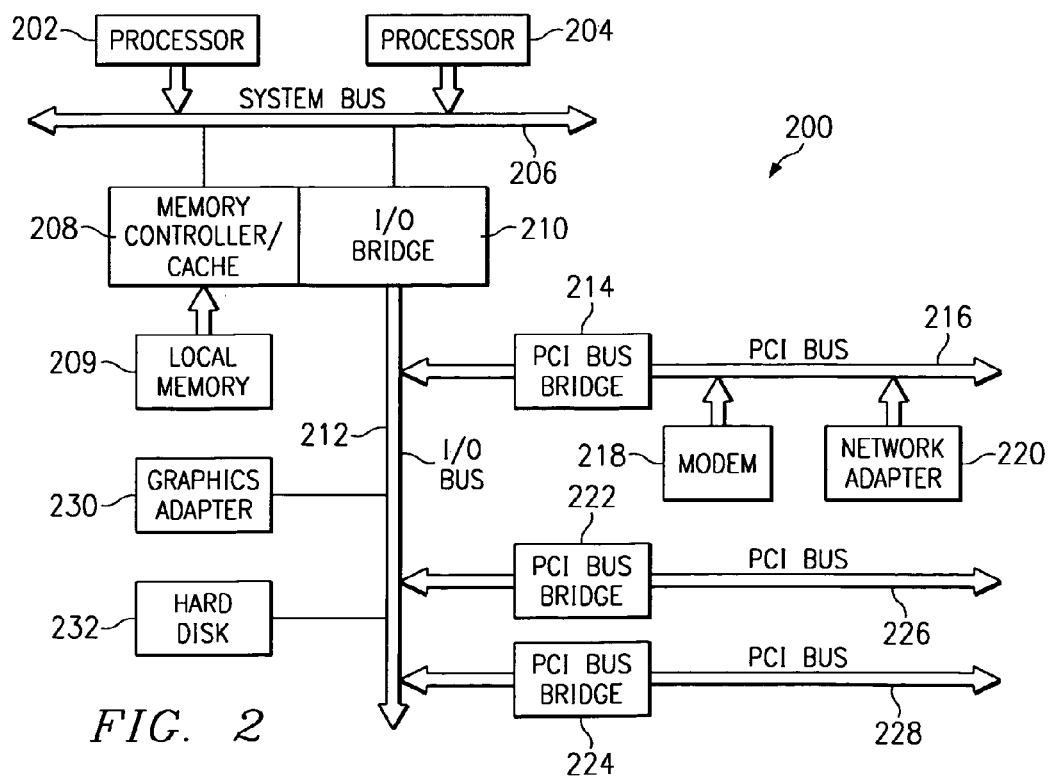
FIG. 2 is an exemplary block diagram of a server according to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

Figure 3:
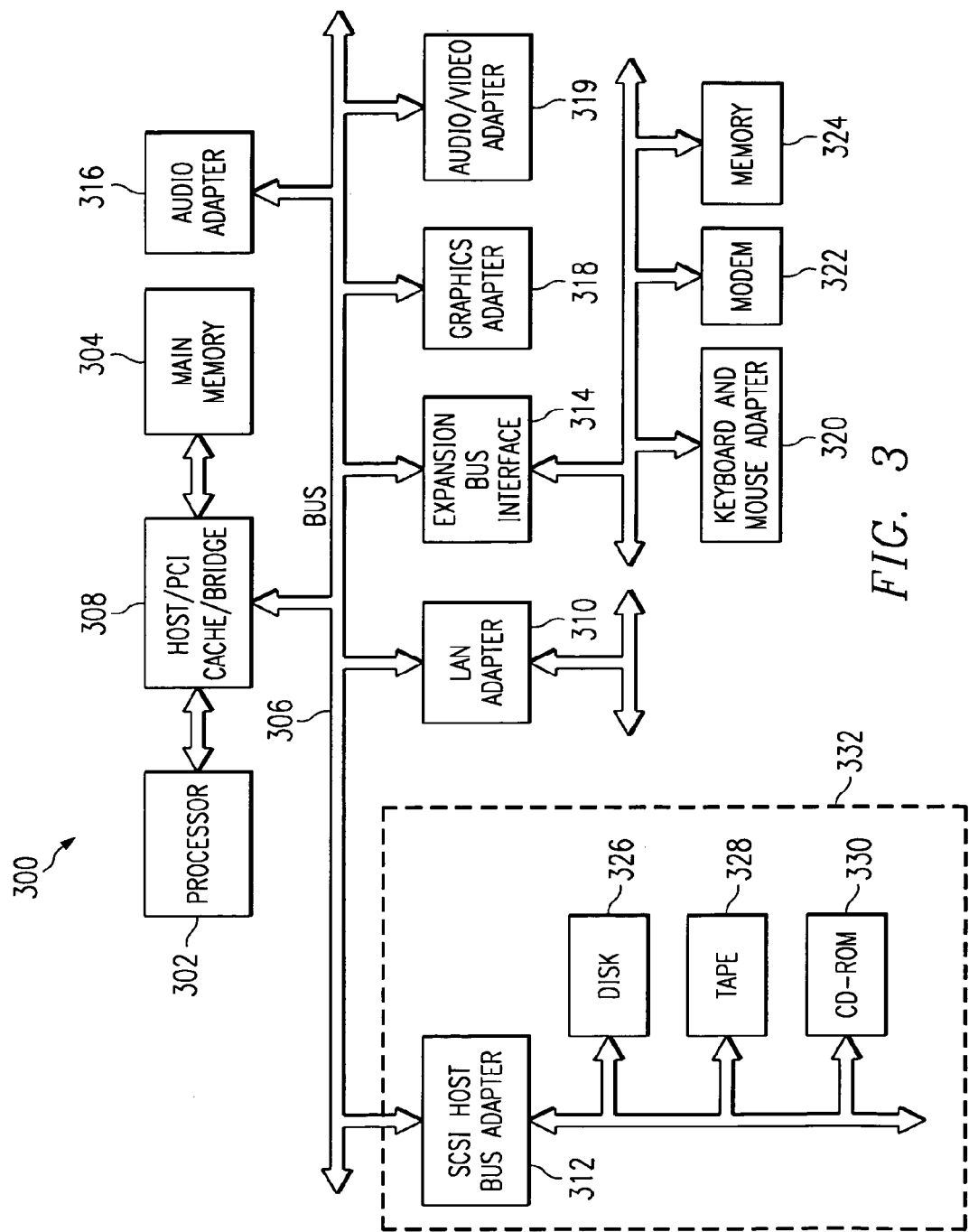
FIG. 3 is an exemplary block diagram of a client according to the present invention.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used.

Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324.

In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

The present invention provides a mechanism by which a plurality of users, such as users of client devices 108, 110 and 112, may obtain full access to a system resource during a same session. Using the present invention, a user on a first client device may have full access to the same data stream as another user on a second client device during the same session. Furthermore, each user may add to the data stream as he/she sees fit and have their additions to the data stream shared with each of the users that are accessing the data stream during that session. Thus, with the present invention, each client device may have a private communication channel to the system resource which is not accessible by other client devices while the output from the resource is shared by all of the client devices participating in a session.

Figure 4:
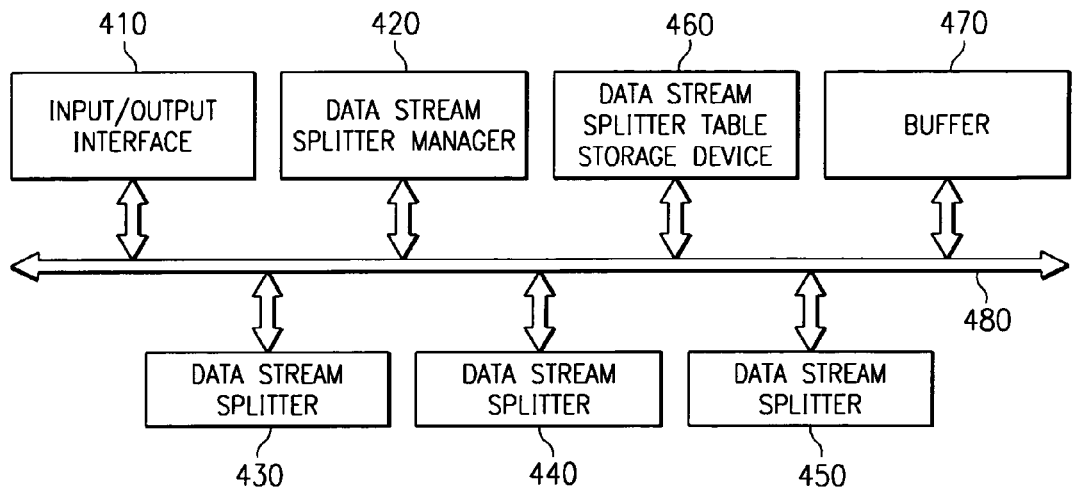
FIG. 4 is an exemplary block diagram of the principle elements of a server in accordance with the present invention.

In order to provide the mechanism set forth above, a server, such as server 104, implements a data stream splitter manager and one or more data stream splitters. FIG. 4 is an exemplary block diagram illustrating the primary elements of a server in accordance with the present invention. As shown in FIG. 4, the server includes an input/output interface 410, a data stream splitter manager 420, a plurality of data stream splitters 430-450, a data stream splitter table storage device 460, and a buffer 470. These elements are shown being coupled via a signal/data bus 480, however any other mechanism for coupling these elements may be utilized without departing from the spirit and scope of the present invention. The elements 410-470 may be implemented as hardware, software, or a combination of hardware and software without departing from the spirit and scope of the present invention.

The data stream splitter manager 430 manages client device's access to the one or more data stream splitters. Each data stream splitter 430-450 handles a particular data stream to which the client devices may have access. The data stream splitters may be dynamically constructed/deconstructed as needed. For example, if a new session is initiated with a system resource that is not currently being handled by an existing data stream splitter, a new data stream splitter may be constructed to facilitate sharing of the data stream to and from the system resource. Similarly, once a session has ended, the data stream splitter for that session may be deconstructed if no longer needed.

While the preferred embodiments of the present invention will be described in terms of each data stream splitter 430-450 handling a single data stream, it is intended to be within the scope of the present invention that a single data stream splitter 430-450 may handle a plurality of different data streams. In such an embodiment, each data stream would be provided with an identifier that is recognizable by the data stream splitter 430-450 and utilized by the data stream splitter manager 420 to identify a data stream for a particular session.

With the present invention, a client device establishes a session for a data stream via the data stream splitter manager 420. The client device establishes the session by sending a request message to the data stream splitter manager 420 via a network, such as network 102, and input/output interface 410. The request message includes client device characteristic information, e.g., network address, user identification, password, bit rate, and the like. The request message also includes an indicator of the system resource to which the client device desires access.

The data stream splitter manager 420 establishes a pseudo-terminal for the client device and stores client device information in a data stream splitter table in data stream splitter table storage device 460 for the particular data stream splitter handling the data stream. The data stream splitter table may be a single table having entries for all data stream splitters that are currently active or may be comprised of a plurality of tables, each designated for only a single data stream splitter.

The pseudo-terminal is used primarily for ease of use, setup control of communication characteristics, and reporting by tools which can key onto a pseudo-terminal name. The pseudo-terminal provides a mechanism by which the data stream splitter communicates with the client devices participating in a session through the data stream splitter manager 420. While the preferred embodiment of the present invention is described as making use of pseudo-terminals, the use of pseudo-terminals is not essential to the functioning of the present invention.

The client device information stored in the data stream splitter table may include, for example, a client device identifier, network address, pseudo-terminal identifier, data stream splitter identifier, and the like. The data stream splitter table storage device 460 may be a shared storage device such that the data stream splitters 430-450 may share access the storage device along with the data stream splitter manager 420.

The data stream splitter cycles through the entries in its corresponding data stream splitter table in the data stream splitter table storage device 460. As the data stream splitter cycles through the entries, the data stream splitter provides a corresponding pseudo-terminal with access to the data stream and will begin sending the data stream output to the pseudo-terminal.

In the case where a large data stream splitter table is used, only those pseudo-terminals associated with entries in the data stream splitter table identified as requesting access to the data stream handled by the data stream splitter will be provided access to the data stream. Other entries in the large data stream splitter table will not be provided access to the data stream if they are not marked for attachment to that specific data stream. In the case where individual tables are being used for each data stream splitter, all of the pseudo-terminals associated with entries in the table will be provided access to the data stream in the manner set forth above.

In addition to sending the data stream to the client devices, the data stream splitter manager 420 receives input from the client devices and applies the input to the corresponding pseudo-terminal in accordance with the data stream splitter table in the data stream splitter table storage device 460. The results of a client device's input to the pseudo-terminal are then applied to the data stream and transmitted to each of the client devices participating in the session when the data stream splitter cycles through the entries in the data stream splitter table. In this way, each client device has full access to modify the data stream with the results of the modification being sent to each of the other client devices participating in the session.

In a preferred embodiment, the above process is implemented on a character by character basis. For example, as a user of a client device types input to the data stream, each character typed is sent to the system resource for that data stream. In response, the system resource generates an output. The output from the system resource is immediately sent, via the data stream, to each of the client devices requesting access to the data stream in a sequential and cyclical manner.

Thus, if a first user is typing a command into his/her client device, each character is sent to the system resource via the data stream. The system resource generates an output of a graphical character associated with the particular character input from the first user. This output is sent to each of the other client devices requesting access to the data stream. Thus, all of the client devices in the session will see the first user typing the command as if the first user were typing the command directly using the particular client device. In this way, each user is provided with a realtime output from the system resource based on the input received from the other users and him/herself.

Client devices can join existing sessions via the data stream splitter manager 420 by requesting access to the same system resource that is being accessed by another client device in an established session. When a client device joins an existing session, the client device information, pseudo-terminal information, and data stream splitter information is added to the data stream splitter table maintained by the data stream splitter manager 420 in the data stream splitter table storage device 460. Thereafter, the newly added client device is provided with full access to the data stream for that session.

In addition, each data stream splitter may include a buffer 470 of data from the data stream. This buffer 470 may store, for example, a predetermined amount of data obtained from the data stream for a past predetermined period of time. For example, the buffer 470 may store data obtained from the data stream for the past minute of session time. When a new client device joins the session, the new client device may be provided with this buffered data to provide a context by which the new client device can be joining in the session. The data in the buffer 470 may be continuously updated when the buffer 470 becomes full. Thereby, old data in the buffer 470 is cycled out, e.g., overwritten, when new data is received.

Figure 5:
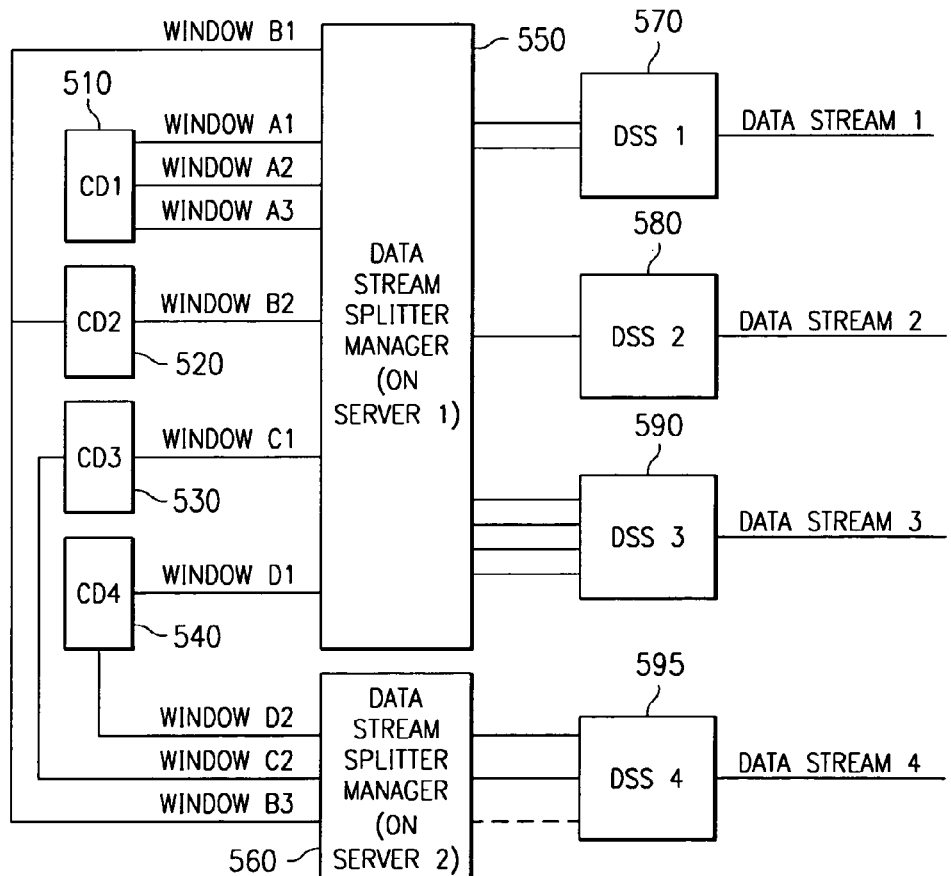
FIG. 5 is an exemplary diagram illustrating an exemplary implementation of the present invention.

FIG. 5 is a block diagram illustrating an implementation of the present invention. As shown in FIG. 5, a plurality of client devices 510-540 are involved in a number of sessions. Each client device 510-540 is capable of being a participant in a plurality of sessions. The sessions shown in FIG. 5 are implemented as "windows," which herein refers to a view port through which software is run under any operating system.

Each session is managed by one of the data stream splitter managers 550 and 560 and is handled by one of the data stream splitters 570-595. Each data stream splitter 570-595 sends and receives data along one data stream, e.g., data stream 1, 2, 3 or 4.

In the specific example shown in FIG. 5, there is one bi-directional input/output data stream per line between two entities. The data streams 1-4 are any data streams which would normally, in prior art systems, send output to and receive input from a single client device. These data streams may be, for example, data streams consisting of input/output to a debug application, a document editor, an application trace program, or any other type of system resource which may send output to a client device and/or receive input from a client device.

As shown in FIG. 5, the client device 510 is involved in three sessions, all being managed by data stream splitter manager 550. Each session is implemented as a pseudo-terminal in the data stream splitter manager, i.e. window A1, A2 and A3, and is handled by a different data stream splitter 570, 580 and 590, respectively. Client devices 530 and 540 are likewise involved in a plurality of sessions being managed by data stream splitter manager 550 and 560. Client device 520 is involved in two sessions, window B1 and window B2, and is attempting to join a third session, window B3.

Thus, the data stream 1 is shared by client devices 510 and 520. The data stream 2 is being accessed by only client device 510. The data stream 3 is being shared by all four client devices 510-540. Data stream 4 is being shared by client devices 530 and 540, with client device 520 attempting to share data stream 4.

In the case of client device 520, the client device attempts to join a session to share data stream 4 by connecting to a known port on server 2, on which data stream splitter manager 560 is operating. The data stream splitter manager 560 forks a copy of itself, i.e. creates an additional instance of the currently running code, described more fully hereafter, to handle input/output to the client device 520 window B3. The data stream splitter manager 560 also opens a pseudo-terminal for communication with data stream splitter 595, which is already handling input/output between data stream 4 and windows C2 and D2 of client devices 430 and 440.

The forked copy of the data stream splitter manager 560 then sets elements in the data stream splitter table to let the data stream splitter 595 know on what pseudo terminal the data stream splitter manager 560 will be communicating for the client device. When the data stream splitter 595 cycles through the entries in the data stream splitter table, the data stream splitter 595 sends data stream 4 output to the various windows C2, D2 and B3. The data stream splitter 595 also sends any input from the windows C2, D2 and B3 to the data stream 4. Should any of the client devices 510-540 disconnect from the data stream splitter manager 560, the data stream splitter table will be updated accordingly by removing the entry for that pseudo-terminal and thus, the data stream splitter 595 will stop sharing the data stream 4 with that client device.

Furthermore, in an alternative embodiment, the data stream splitter manager 560 may maintain a data stream splitter table for a data stream splitter and a particular data stream even if all of the client devices involved in the session disconnect from the data stream splitter manager 560. This maintaining of the data stream splitter table may be performed for a predetermined period of time, or may be maintained indefinitely until a command to logically remove the session from the data stream splitter table is received from a client device or network administrator, depending on the particular system requirements. In this way, all of the client devices may disconnect, such as at the end of a work day, and resume the session at a later time.

The data stream splitter manager of the present invention may be implemented as an application running on a server that is either apparent or unapparent to the client devices. For example, the data stream splitter manager may be implemented as an application used by a client device or may be implemented as a daemon process on a server that receives data from the client device and processes the data without the user of the client device being made aware of the presence of the data stream splitter manager.

In a further implementation, the data stream splitter manager may be implemented as an application having a graphical user interface through which a user of a client device may select to start a new session, join an existing session, leave a session, return to a session, or the like. In addition, various options such as displaying active connections, showing a listing of commands, obtaining on-line help and the like, may be provided.

In summary, in a particular embodiment of the present invention described above, the data stream splitter manager 560 listens for new connection requests from client devices, for example, on a known network port. When a connection is made from a client device, the data stream splitter manager 560 forks a copy of the currently running code, i.e. the data stream splitter manager 560, and returns to listening for the next new connection.

The forked copy of the data stream splitter manager 560, hereafter referred to as the client-specific server, may perform the following functions. The client-specific server exchanges/verifies software versions between the client device and the server and verifies any optional security information. This may include making sure the connecting client device hostname is authorized, making sure the connecting client device username is authorized, prompting for and accepting/rejecting a password, making sure the system resource to be shared is authorized to be accessible by the client device, changing the username to upgrade/downgrade authority, changing a group name to upgrade/downgrade authority, and the like.

The client-specific server may further handle command flag and menu requests to start a new data stream splitter, join an existing data stream splitter, look for a system resource already being multiplexed and then join a data stream splitter or start a new one as appropriate, leave a current data stream splitter, report on current connections, quit a connection, and the like. Moreover, the client-specific server pipelines communication from data stream splitter code to client devices by reading data read from the pseudo-terminals specific to this unique combination of data stream splitter and client-specific server, then writing the same data over sockets network protocol to the client devices. Additionally, the client-specific server pipelines communication from client devices to data stream splitter code by reading data from the client devices over the sockets network protocol and then writing the same data to the pseudo-terminals specific to this unique combination of data stream splitter and client specific server.

The data stream splitter, such as data stream splitter 595, uses non-blocking raw input so that any data from any connected client device will go directly to the data stream without any delay waiting for other client devices and without filtering any particular bit patterns, such as escape sequences. By the term "non-blocking" what is meant is that there is no processing of the input by the client device prior to the input being sent to the data stream. Thus, as a user types a character on the client device, this character is immediately sent to the data stream without waiting for the user to select a transmit function, press the "Enter" button, or the like. In this way, each client device participating in a session will be provided with realtime output from the system resource based on inputs received by the system resource from each of the client devices.

The data stream splitter accesses the particular system resource by redirecting input and output to and from that system resource through a single point to single point communication path. The data stream splitter records streamed data coming out of the system resource into a playback buffer so the data stream splitter can still be "seen" by clients who were not connected in time to see the output "live" at the time the system resource sent it. Additionally, the data stream splitter continually scans the data stream splitter table and connects those client devices requesting to be connected, disconnects those client devices requesting to be disconnected, sends any data not yet sent to a client device from the multiplexed data stream to that client device using the pseudo-terminal for that client device, sends any data not yet sent to the multiplexed data stream from the client device to the multiplexed data stream, and optionally exits when the number of connected client devices connected reaches zero.

Thus, with the present invention, the data stream splitter manager spawns copies of itself as client-specific servers on an as needed basis. Similarly, the client-specific servers spawn data stream splitters on an as needed basis. The client device communicates with the data stream splitter manager just long enough for the data stream splitter manager to create a client-specific server for that client device. Thereafter, the client device relays communication between the user and the client-specific server over the network.

As described above, the present invention provides a mechanism through which a plurality of client devices may share the same data stream and have full access to modify the shared data stream. In addition, the present invention provides a mechanism by which modifications made by one client device to a data stream are transmitted to all other client devices active during a session.

Figure 6A:
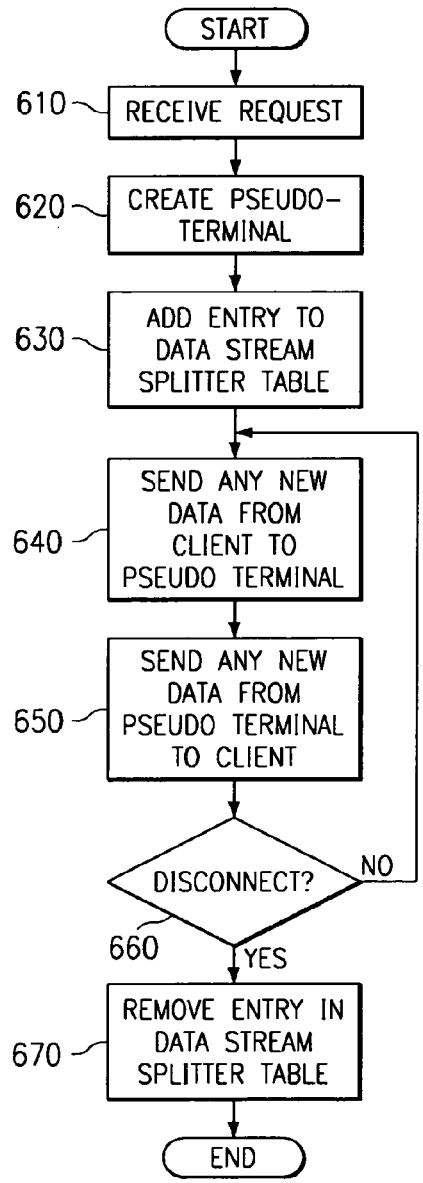
FIGS. 6A and 6B are flowcharts outlining an exemplary operation of the present invention.

FIG. 6A is a flowchart outlining an exemplary operation of a data stream splitter manager of the present invention when starting/joining a session to share a data stream. As shown in FIG. 6A, the operation begins with a request for access to a data stream being received (step 610). A pseudo-terminal is created for the client device (step 620). An entry in the data stream splitter table for the requested data stream is added identifying the client device and the pseudo-terminal (step 630). Thereafter, the data stream splitter manager sends any new data from the client device to the pseudo-terminal (step 640) and any new data from the pseudo-terminal to the client device (step 650).

The data stream splitter manager monitors for a disconnect from the client device (step 660) and if the client device disconnects, removes the entry in the data stream splitter table for the client device (step 670). Otherwise, if the client device does not disconnect, the data stream splitter manager returns to step 640.

Figure 6B:
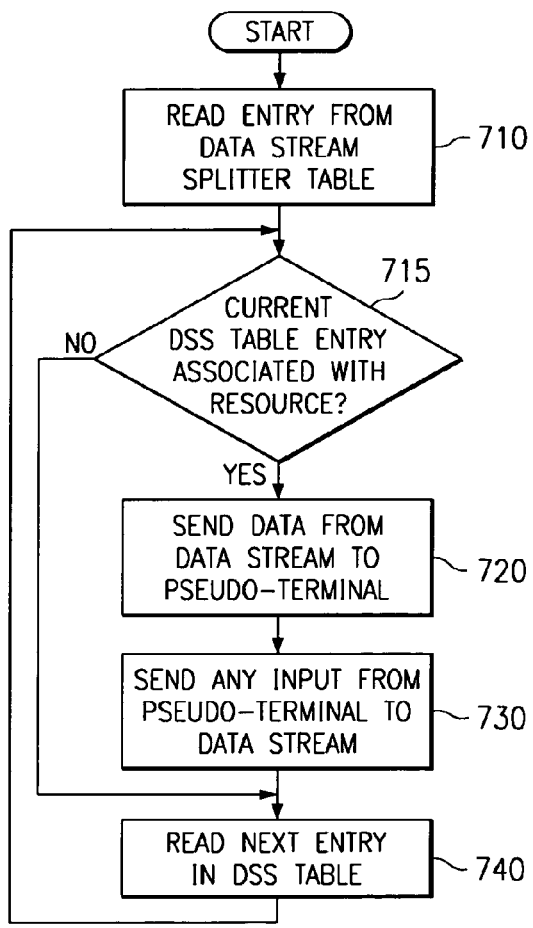

FIG. 6B is a flowchart outlining an exemplary operation of a data stream splitter of the present invention when sending/receiving data to and from a data stream. As shown in FIG. 6B, the operation starts with the data stream splitter reading an entry from the data stream splitter table in the data stream splitter manager (step 710). The data stream splitter determines if the current data stream splitter table entry is associated with the resource that this data stream splitter is serving (step 715). If not, the operation jumps to step 740; otherwise, the operation continues to step 720.

The multiplexer sends data from the data stream to the pseudo-terminal associated with the entry from the data stream splitter table (step 720). Thereafter, the data stream splitter sends any input from the pseudo-terminal to the data stream (step 730). The data stream splitter then reads the next entry in the data stream splitter table (step 740) and returns to step 720.

FIG. 7 illustrates an example display from a client device of a shared session for a data stream. The particular application of the present invention shown in FIG. 7 is to a debug session for debugging a computer program. However, one of ordinary skill in the art will appreciate that the present invention is not limited to any particular type of data stream. Rather, the present invention may be applied to any type of data stream including, audio, video, textual data streams and the like.

As shown in FIG. 7, the display includes a first listing of debug information with an identifier that the debugger has been entered via keyboard. Thereafter, a conversation commences between two users, using two different client devices. The conversation is facilitated by the command prompt of the debugger application. Thus, because the textual comments of the two users include words not recognized by the debugger, some error statements are shown.

The users are discussing the debug information previously displayed. Each user has access to the data stream such that each user sees on his/her client device the debug information as well as the comments from the other user and the error messages. Thus, each user has complete access to modify the data stream and is provided with the modifications entered by other users.

The comments from the two users are displayed as the user types them. In other words, the output seen by the users is raw output from the system resource. As a result, if a first user mistypes a command and backspaces to correct the command, the second user will see the typing of the mistyped command and the backspacing as it occurs. Similarly, if both users are typing commands at the same time, the result will be a garbled command interleaving both inputs from the users. Thus, the present invention provides a mechanism by which both users have complete and full access to the data stream at approximately the same time. Each user is provided with a realtime display of the modified data stream based on the inputs from the other user and him/herself.

As described above, the present invention provides an apparatus and method for providing a plurality of client devices shared access to a data stream, and thus, to system resources accessed during a session. This shared access allows each user to modify the data stream and be provided with other user's modifications to the data stream.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product stored in a computer readable storage device having instructions embodied therein that are executable by a computer for providing a device shared access to a data stream, the computer program product comprising:
    instructions for receiving by a data stream splitter manager in a server device a request via a network for access to the data stream from a client device within a plurality of client devices, wherein the data stream splitter manager forks a copy of itself in the server device to handle the access to the data stream for that client device;
    instructions for adding an entry to a data stream splitter table for the client device; and
    instructions for providing the client device access to the data stream via a data stream splitter component in the server device in accordance with the entry in the data stream splitter table, wherein the forked copy of data stream splitter manager dynamically constructs the data stream splitter component in the server device which provides shared access to the data stream by the plurality of client devices in response to determining that the data stream is not already being handled by another data stream splitter component.

2. The computer program product of claim 1, wherein access to the data stream is shared by the plurality of client devices, each of the client devices within the plurality of client devices having full access to the data stream at a same time to modify the data stream.

3. The computer program product of claim 1, wherein the client device is provided a private communication channel to the data stream but an output from the data stream is shared by the client device and plurality of client devices.

4. The computer program product of claim 1, further comprising:
    instructions for generating, by the data stream splitter manager, a pseudo-terminal for the client device that provides data communication between the data stream splitter component and the client device, wherein data received by the data stream splitter component from the data stream is sent to the pseudo-terminal and data received by the pseudo-terminal from the client device is sent to the data stream splitter component.

5. The computer program product of claim 1, wherein the instructions for providing the device access to the data stream include:
    instructions for cycling through the data stream splitter table to identify entries associated with the data stream splitter component; and
    instructions for cyclically providing the client device and plurality of client devices access to the data stream based on the cycling through the data stream splitter table.

6. The computer program product of claim 1, further comprising:
    instructions for determining whether access to the data stream is being handled by the data stream splitter component, wherein the instructions for adding the entry to the data stream splitter table for the client device include instructions for adding the entry to a data stream splitter table associated with the data stream splitter component.

7. The computer program product of claim 1, further comprising:
    instructions for receiving from at least two of the plurality of client devices input to modify the data stream;
    instructions for combining the input to modify the data stream from the at least two of the plurality of client devices to produce a combined raw output; and
    instructions for simultaneously outputting in real time the combined raw output of the modified data stream based on the input from the at least two of the plurality of client devices on an output device at each of the plurality of client devices accessing the data stream during a session.

8. An apparatus for providing a device shared access to a data stream, comprising:
    a bus system;
    a storage device connected to the bus system, wherein the storage device contains a set of instructions; and
    a processor connected to the bus system, wherein the processor executes the set of instructions to receive by a data stream splitter manager in a server device a request via a network for access to the data stream from a client device within a plurality of client devices, wherein the data stream splitter manager forks a copy of itself in the server device to handle the access to the data stream for that client device; add an entry to a data stream splitter table for the client device; and provide the client device access to the data stream via a data stream splitter component in the server device in accordance with the entry in the data stream splitter table, wherein the forked copy of data stream splitter manager dynamically constructs the data stream splitter component in the server device which provides shared access to the data stream by the plurality of client devices in response to determining that the data stream is not already being handled by another data stream splitter component.

9. The apparatus of claim 8, wherein the data stream splitter manager generates a pseudo-terminal for the client device that provides data communication between the data stream splitter component and the client device, and wherein data received by the data stream splitter component from the data stream is sent to the pseudo-terminal and data received by the pseudo-terminal from the client device is sent to the data stream splitter component.

10. The apparatus of claim 8, further comprising a playback buffer, wherein data from the data stream is stored in the playback buffer, and wherein when the client device is first provided access to the data stream, the data from the data stream stored in the playback buffer are streamed to the client device.

11. The apparatus of claim 8, wherein the processor executes a further set of instructions to receive from at least two of the plurality of client devices input to modify the data stream; combine the input to modify the data stream from the at least two of the plurality of client devices to produce a combined raw output; and simultaneously output in real time the combined raw output of the modified data stream based on the input from the at least two of the plurality of client devices on an output device at each of the plurality of client devices accessing the data stream during a session.

12. A computer implemented method in a data processing system for providing a device shared access to a data stream, the computer implemented method comprising:
    receiving by a data stream splitter manager in a server device a request via a network for access to the data stream from a client device within a plurality of client devices, wherein the data stream splitter manager forks a copy of itself in the server device to handle the access to the data stream for that client device;

adding an entry to a data stream splitter table for the device; and providing the client device access to the data stream via a data stream splitter component in the server device in accordance with the entry in the data stream splitter table, wherein the forked copy of data stream splitter manager dynamically constructs the data stream splitter component in the server device which provides shared access to the data stream by the plurality of client devices in response to determining that the data stream is not already being handled by another data stream splitter component.

13. The computer implemented method of claim 12, wherein access to the data stream is shared by the plurality of client devices, each of the client devices within the plurality of client devices having full access to the data stream at a same time to modify the data stream.

14. The computer implemented method of claim 12, wherein the client device is provided a private communication channel to the data stream but an output from the data stream is shared by the client device and the plurality of client devices.

15. The computer implemented method of claim 12, further comprising:

generating, by the data stream splitter manager, a pseudo-terminal for the client device that provides data communication between the data stream splitter component and the client device, wherein data received by the data stream splitter component from the data stream is sent to the pseudo-terminal and data received by the pseudo-terminal from the client device is sent to the data stream splitter component.

16. The computer implemented method of claim 12, wherein the step of providing the client device access to the data stream includes:

cycling through the data stream splitter table to identify entries associated with the data stream splitter component; and cyclically providing the client device and the plurality of client devices access to the data stream based on the cycling through the data stream splitter table.

17. The computer implemented method of claim 12, further comprising:

determining whether access to the data stream is being handled by the data stream splitter component, wherein adding the entry to the data stream splitter table for the client device includes adding the entry to a data stream splitter table associated with the data stream splitter component.

18. The computer implemented method of claim 12, further comprising:

receiving from at least two of the plurality of client devices input to modify the data stream;

combining the input to modify the data stream from the at least two of the plurality of client devices to produce a combined raw output; and simultaneously outputting in real time the combined raw output of the modified data stream based on the input from the at least two of the plurality of client devices on an output device at each of the plurality of client devices accessing the data stream during a session.

* * * * *